3,031,316
METHOD AND MATERIAL FOR METALIZING CERAMICS AND FOR MAKING CERAMIC-TO-METAL SEALS
Daniel J. Cavanaugh, Spotswood, N.J., assignor to Radio Corporation of America, a corporation of Delaware
No Drawing. Filed Oct. 2, 1957, Ser. No. 687,607
1 Claim. (Cl. 106—1)

This invention relates to improved methods and materials for metalizing ceramic bodies and for making ceramic-to-metal seals. The invention is particularly directed to an improved composition of matter for metalizing beryllia ceramic bodies so as to provide strong beryllia-to-metal seals.

In general, the bonding of metallic coatings to ceramic bodies is relatively difficult. And of all ceramic materials, beryllia has been one of the most difficult to metalize. Standard metalizing mixtures such as molybdenum-manganese powder and tungsten-iron powder give very little bonding, if any, to beryllia ceramic bodies.

It is therefore an object of this invention to provide an improved method and material for metalizing beryllia ceramic bodies.

Another object of the invention is to provide an improved beryllia ceramic-to-metal seal.

I have found that these objects and other advantages of the invention are attained by adding magnesium oxide (MgO) powder to the standard mixes previously used for ceramic metallizing. This results in a strong adherent bond between the ceramic body and the metallic surface formed. This in turn enables the making of a stronger beryllia ceramic to metal seal.

According to a preferred example, beryllia ceramic bodies are metalized according to the invention by first mixing tungsten, iron, and magnesium oxide powders in the following proportions. To a tungsten-iron mixture of nine parts by weight tungsten and one part by weight iron, about 2 percent by weight of magnesium oxide is added. The particle size of the tungsten and iron is preferably between 1 and 4 microns in order to assure intimate contact with the ceramic surface. However, such is not essential to a successful practice of my invention. The powders are mixed thoroughly in the dry state and then are mixed into a paste by adding an ethyl acetate and nitrocellulose binder until a paint-like consistency is obtained. Alternatively, the binder may be any of the organic film-forming substances, such as ethyl cellulose or methacrylate resins, commonly used and known in the art, which decompose upon heating leaving little or no residue. An excess amount of binder may be used to cause slow drying and to promote adherence to the beryllia surface. An illustrative example is 10 grams iron-tungsten and 0.2 gram magnesium oxide in 3–4 cc. of a binder comprising about 1 gram of nitrocellulose per 43 cc. of ethyl acetate.

The paste containing the metalizing mixture is applied to the beryllia ceramic surface for example with a camel's hair brush. Other methods of applying the paste are possible such as by spraying or by dipping the body into the paste. When applying the paste by brush, the paste should have a consistency comparable to that of paint. A smooth coating about 0.002 inch thick can be obtained by brushing the paste with a paint-like consistency onto the ceramic surface.

The ceramic body which has thus been coated is then placed into a molybdenum boat, care being taken to prevent contact between the metal powder coating and the surface of the boat. Alternatively, instead of a molybdenum boat, porous alumina plates may be employed. The molybdenum boat containing the coated ceramic is then placed in a furnace and fired in hydrogen at a temperature of about 1500° C. for about 5 to 10 minutes. Firing may be accomplished in any suitable reducing atmosphere although the best bond of the metalized coating to the ceramic appears to be obtained when the firing is in hydrogen. Another good reducing atmosphere which may be used is "forming gas" consisting of 5–10 percent hydrogen with the balance nitrogen. The firing temperature is not critical and depends upon the characteristics of the beryllia itself. Actually temperatures between 1450° and 1600° C. have been found suitable.

If it is desired to make a ceramic-to-metal seal, the metalized area is then nickel or copper coated so that the beryllia body can be brazed to the metallic body. In general, the iron-tungsten metalized area is not easily wet for brazing purposes hence the desirability of coating the area with nickel or copper. Such coating may, e.g., be provided by electroplating or by painting on a coating of nickel or copper powder suspended in a binder similar to that used with the metalized coating. If the coating is provided by the latter procedure, it either may be fired to sinter or simply dried. For example, to sinter a nickel coating, the coated beryllia body is fired in a reducing atmosphere at 900° C. to 1000° C. for 2 to 5 minutes.

After the metalized ceramic body is coated with nickel or copper it is placed in contact with the metal body or part to which it is to be brazed. The metalized area is between the two bodies. Additional brazing materials and fluxes may be employed to enhance the brazing process. It has been found that hard or soft solders may be used for this purpose depending upon the ultimate use to which the joined bodies may be put; if intended for use in apparatus subject to high operating temperatures, it is preferred to use the hard solders because of their higher melting points. By "soft" solders it is meant to include solders containing relatively low melting point materials such as for example bismuth, lead, cadmium, or tin. "Hard" solders include materials having relatively higher melting points, such as silver or copper or alloys thereof. These brazing materials are well known and are commercially obtainable under various trade names. One typical suitable example of a hard solder comprises 80 percent copper, 15 percent silver, and 5 percent phosphorous. Another suitable example is a eutectic solder comprising 28 percent copper and 72 percent silver. After the two bodies are in contact with the brazing material between the metal body and the plated metalized portion of the ceramic body, the assembly is fired to make the braze.

The quantity of magnesium oxide added to the preferred tungsten-iron mixture may be varied considerably. The percentage by weight of magnesium oxide in the example given was approximately 2 percent; however, it has been found that the percentage by weight of the magnesium oxide may be varied from approximately 2 to 10 percent of the total weight and still produce excellent bonding qualities.

Although, along with the magnesium oxide additive, it is preferred to use a metalizing mixture of 9 parts by weight of tungsten to 1 part by weight of iron, other proportions of these elements or other metalizing materials may be used. For example, tungsten or iron alone may be combined with the magnesium oxide, as may molybdenum or a conventional molybdenum-manganese mix. In any case, the percentage by weight of magnesium oxide added is in accordance with the limits and preferred amounts hereinbefore stated.

Although other ceramic materials may be metalized according to the invention, it is of particular advantage wherever it is desired to metalize beryllia ceramic bodies. One important application of the invention is the metalizing of beryllia ceramic insulators so that they can be brazed to a metallic cap in the manufacture of electron tubes where high thermal conductivity is required through the ceramic. Beryllia is a particularly desirable ceramic to use where rapid heat transfer is required because of its high thermal conductivity factor. In many applications, however, it is desired to join the beryllia bodies to integral metallic parts of the electron tube itself. The invention thus is of great advantage for permitting joinder of such beryllia bodies to metallic bodies.

What is claimed is:

A composition of matter consisting essentially of a mixture of magnesium oxide, and a metallic ingredient consisting essentially of 9 parts tungsten to one part iron, the amount of said magnesium oxide being about 2 percent by weight of said mixture.

References Cited in the file of this patent

UNITED STATES PATENTS

| | | |
|---|---|---|
| 1,790,918 | Hauser | Feb. 3, 1931 |
| 2,096,538 | Durrant | Oct. 19, 1937 |
| 2,114,692 | Ward | Apr. 19, 1938 |
| 2,130,879 | Dobke | Sept. 20, 1938 |
| 2,163,407 | Pulfrich | June 20, 1939 |
| 2,163,408 | Pulfrich | June 20, 1939 |
| 2,458,533 | Schoenlaub | Jan. 11, 1949 |
| 2,571,101 | Austin | Oct. 16, 1951 |
| 2,708,787 | Chick et al. | May 24, 1955 |
| 2,903,544 | Reichelt et al. | Sept. 8, 1959 |
| 2,914,402 | Becker | Nov. 24, 1959 |